(12) United States Patent
Mizokane et al.

(10) Patent No.: US 11,535,312 B2
(45) Date of Patent: Dec. 27, 2022

(54) REAR VEHICLE-BODY STRUCTURE OF A VEHICLE

(71) Applicant: MAZDA MOTOR CORPORATION, Hiroshima (JP)

(72) Inventors: Michiya Mizokane, Aki-gun (JP); Yoshiatsu Kuga, Aki-gun (JP)

(73) Assignee: MAZDA MOTOR CORPORATION, Hiroshima (JP)

(*) Notice: Subject to any disclaimer, the term of this patent is extended or adjusted under 35 U.S.C. 154(b) by 184 days.

(21) Appl. No.: 17/192,074

(22) Filed: Mar. 4, 2021

(65) Prior Publication Data

US 2021/0309307 A1   Oct. 7, 2021

(30) Foreign Application Priority Data

Apr. 2, 2020   (JP) .............................. JP2020-066357

(51) Int. Cl.
| | | |
|---|---|---|
| *B62D 37/02* | (2006.01) | |
| *B62D 25/08* | (2006.01) | |
| *B60R 19/02* | (2006.01) | |
| *B60Q 1/30* | (2006.01) | |

(52) U.S. Cl.
CPC .............. *B62D 37/02* (2013.01); *B60Q 1/30* (2013.01); *B60R 19/02* (2013.01); *B62D 25/08* (2013.01)

(58) Field of Classification Search
CPC ...... B62D 37/02; B62D 25/08; B60Q 1/0017; B60Q 1/30; B60R 19/02
See application file for complete search history.

(56) References Cited

U.S. PATENT DOCUMENTS

| | | | |
|---|---|---|---|
| 2013/0119703 A1 | 5/2013 | Fujii et al. | |
| 2016/0061397 A1* | 3/2016 | Ito | B60Q 1/304 |
| | | | 362/520 |
| 2018/0257543 A1* | 9/2018 | Nakamura | F21S 43/239 |
| 2019/0263459 A1* | 8/2019 | Takahashi | F21S 43/00 |
| 2021/0309307 A1* | 10/2021 | Mizokane | B60R 19/02 |

FOREIGN PATENT DOCUMENTS

| | | | | |
|---|---|---|---|---|
| DE | 102015216413 A1 * | 3/2016 | | B60Q 1/0041 |
| WO | 2011138931 A1 | 11/2011 | | |
| WO | WO-2011145404 A1 * | 11/2011 | | B60Q 1/0017 |
| WO | WO-2017073451 A1 * | 5/2017 | | B60Q 1/26 |
| WO | WO-2018132384 A1 * | 7/2018 | | B60Q 1/0483 |

* cited by examiner

*Primary Examiner* — Lori L Lyjak
(74) *Attorney, Agent, or Firm* — Studebaker & Brackett PC

(57) ABSTRACT

A rear vehicle-body structure separates air flowing on a side of the vehicle so as not to flow around to a rear of the vehicle, to ensure aerodynamic performance. The disclosed rear vehicle-body structure has a rear combi lamp mounted on a vehicle-width-direction outer side face of a vehicle rear portion, and a rear bumper mounted under the rear combi lamp. The rear combi lamp includes, on the vehicle-width-direction outer side face, a curved portion that is curved from a vehicle-width-direction outer side forwardly inward in a vehicle width direction in a vehicle plan view. The curved portion has a curvature increasing toward a lower side of the vehicle. A protruding portion protruding toward the vehicle-width-direction outer side as going to a rear of the vehicle is provided at a front portion of the curved portion.

13 Claims, 8 Drawing Sheets

REAR VEHICLE-BODY STRUCTURE OF A VEHICLE

TECHNICAL FIELD

The present disclosure relates to a rear vehicle-body structure of a vehicle, including a rear combi lamp mounted on a vehicle-width-direction outer side face of a vehicle rear portion, and a rear bumper mounted under the rear combi lamp.

BACKGROUND

Conventionally, for example, as disclosed in International Publication No. WO2011/138931, it has been known that a rectification fin is mounted on a vehicle-width-direction outer side face of a rear combi lamp (more specifically, rear combination lamp) mounted at a vehicle rear portion, and the air flowing at a vehicle body side portion (namely, a vehicle body side-face airflow) is rectified by the rectification fin. However, in the conventional structure disclosed in International Publication No. WO2011/138931, the rectification fin is relatively long in a vehicle front-rear direction, which causes a problem of lack of designability of the vehicle.

SUMMARY

This disclosure provides a rear vehicle-body structure of a vehicle that separates the air flowing at the vehicle body side portion (i.e., vehicle body side-face airflow) so as not to flow around to the rear of the vehicle, and thereby makes it possible to prevent the vehicle body side-face airflow from flowing around to the rear of the vehicle, and ensure aerodynamic performance.

A rear vehicle-body structure of a vehicle according to the present disclosure includes a rear combi lamp mounted on a vehicle-width-direction outer side face of a vehicle rear portion, and a rear bumper mounted under the rear combi lamp, wherein the rear combi lamp includes, on the vehicle-width-direction outer side face, a curved portion that is curved from a vehicle-width-direction outer side forwardly inward in a vehicle width direction in a vehicle plan view, the curved portion has a curvature increasing toward a lower side of the vehicle, and a protruding portion that protrudes toward the vehicle-width-direction outer side as going to a rear of the vehicle is provided at a front portion of the curved portion. According to the above configuration, the air on a side of the vehicle (the vehicle body side-face airflow) can be separated at the protruding portion to prevent the vehicle body side-face airflow from flowing around to the rear of the vehicle, thereby ensuring aerodynamic performanc.

In particular, the curved portion is formed to have a curvature increasing toward the lower side of the vehicle due to vehicle designability, and, on the vehicle-width-direction outer side of the rear combi lamp, a lower portion of the curved portion has a shape constricted toward the vehicle-width-direction inner side as going to the lower side. If the protruding portion is not present, the vehicle body side-face airflow flows around to the rear of the vehicle from this portion, but, separating the vehicle body side-face airflow at the protruding portion makes it possible to prevent the vehicle body side-face airflow from flowing around to the rear of the vehicle.

In one embodiment of the present disclosure, the curved portion of the rear combi lamp is located on the vehicle-width-direction outer side relative to an upper outside face of the rear bumper adjacent to the rear combi lamp, in the vehicle plan view. According to the above configuration, the protruding portion is provided at a position at which the air flowing on a side of the vehicle (the vehicle body side-face airflow) is drawn to the vehicle-width-direction inner side. In short, the protruding portion is provided in front of a portion of the curved portion of the rear combi lamp, which protrudes to the vehicle-width-direction outer side relative to an upper outside face of the rear bumper. Consequently, it is possible to separate the vehicle body side-face airflow from the vehicle at the protruding portion, prevent the vehicle body side-face airflow from flowing around to the rear of the vehicle, and prevent turbulence of the vehicle body side-face airflow.

According to this disclosure, there are advantageous effects of separating the air flowing on a side of the vehicle (i.e., the vehicle body side-face airflow) so as not to flow around to the rear of the vehicle, preventing the vehicle body side-face airflow from flowing around to the rear of the vehicle, and ensuring aerodynamic performance.

DETAILED DESCRIPTION

The objective of separating the air flowing on a side of a vehicle (i.e., vehicle body side-face airflow) so as not to flow around to the rear of the vehicle, preventing the vehicle body side-face airflow from flowing around to the rear of the vehicle, and ensuring aerodynamic performance is realized by a rear vehicle-body structure of a vehicle, including a rear combi lamp mounted on a vehicle-width-direction outer side face of a vehicle rear portion, and a rear bumper mounted under the rear combi lamp, wherein the rear combi lamp includes, on the vehicle-width-direction outer side face, a curved portion that is curved from a vehicle-width-direction outer side forwardly inward in a vehicle width direction in a vehicle plan view, the curved portion has a curvature increasing toward a lower side of the vehicle, and a protruding portion that protrudes toward the vehicle-width-direction outer side as going to the rear of the vehicle is provided at a front portion of the curved portion.

Figure 1:
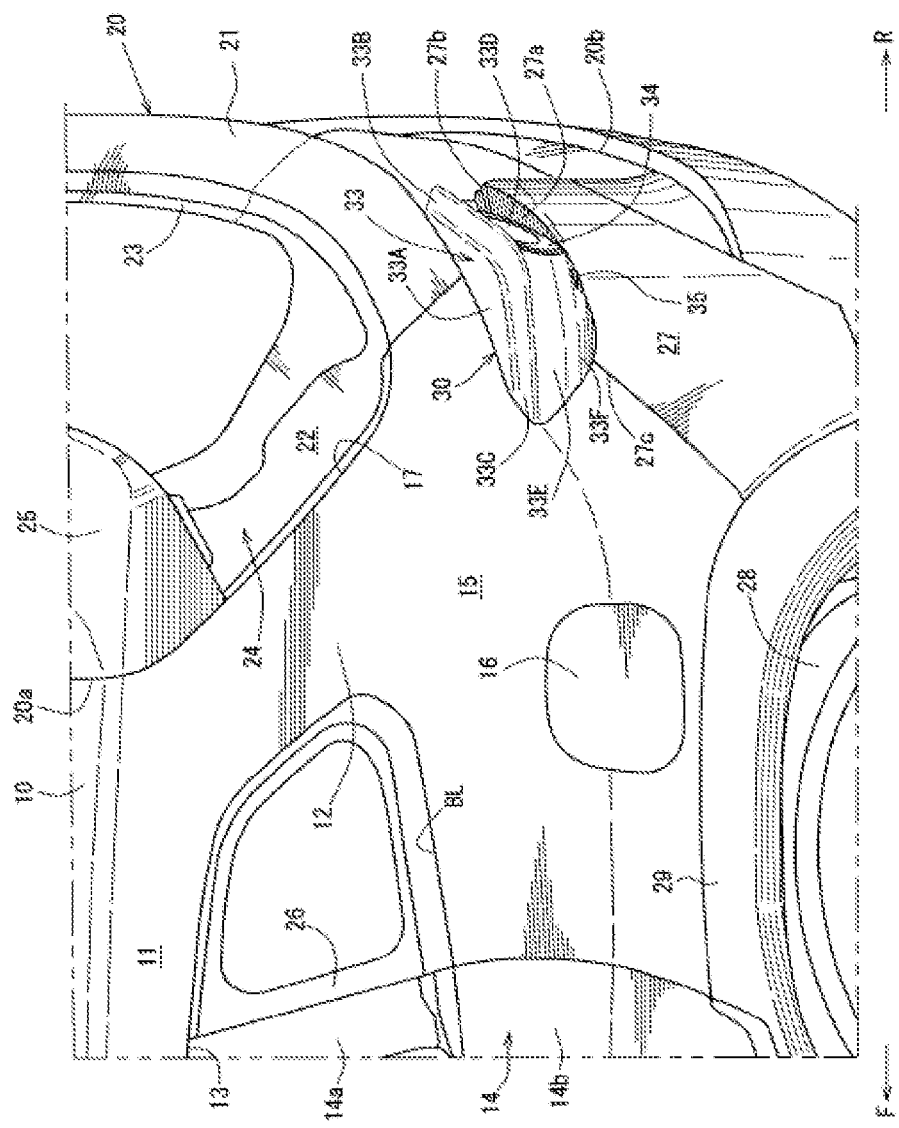
FIG. 1 is a perspective view showing a state of a rear vehicle-body structure of a vehicle of the present disclosure as viewed from diagonally above the left side of the vehicle.
Figure 2:
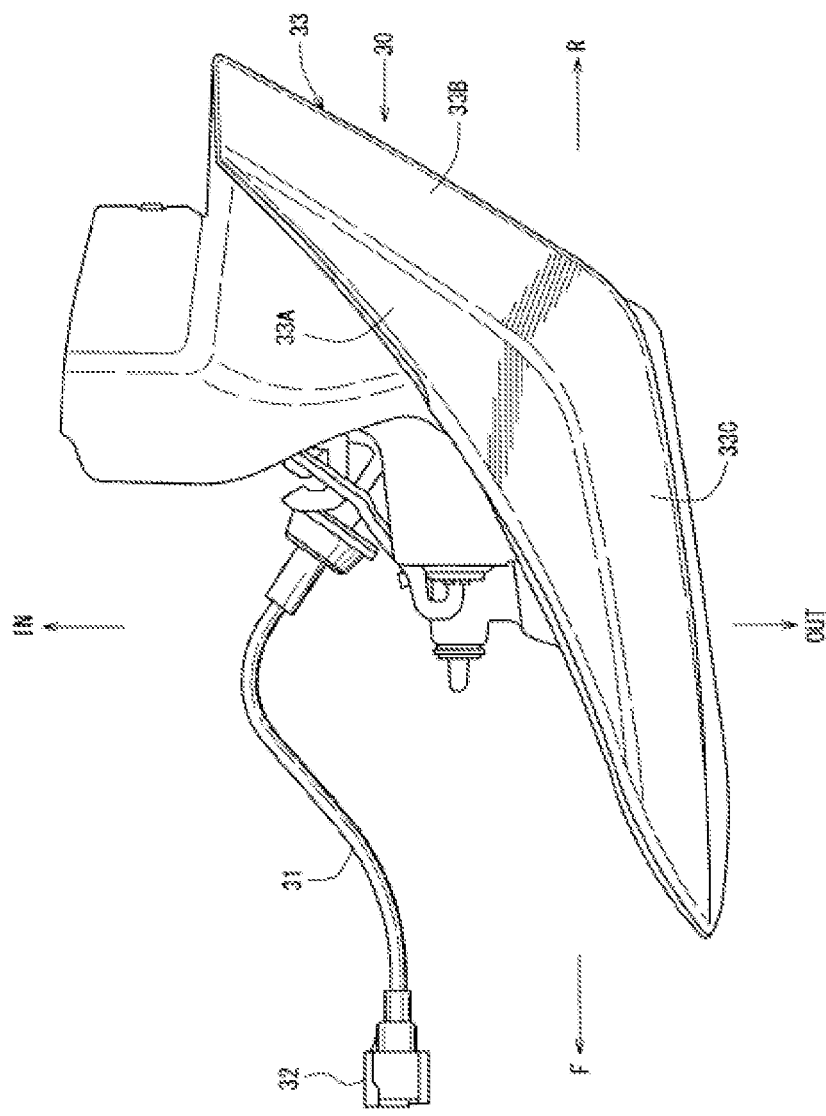
FIG. 2 is a plan view of a rear combi lamp.
Figure 3:
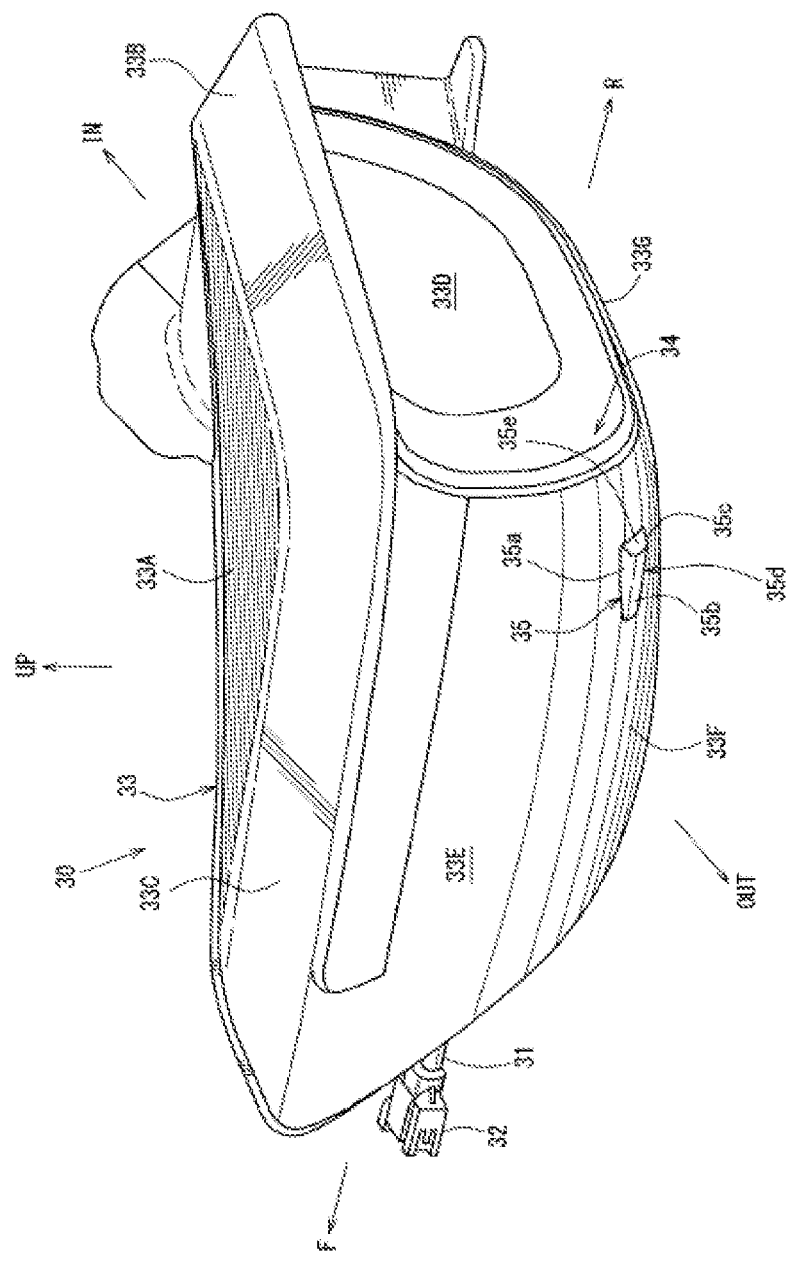
FIG. 3 is a perspective view of the rear combi lamp.
Figure 4:
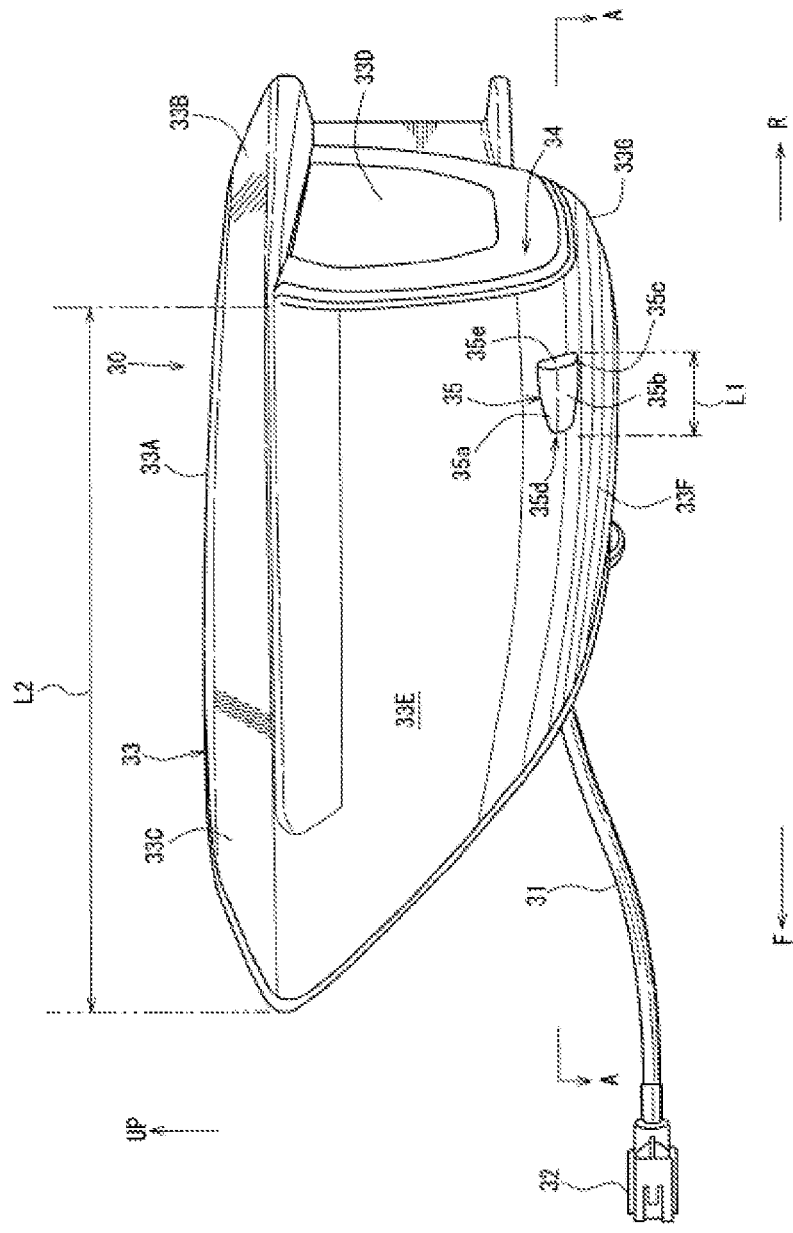
FIG. 4 is a side view of the rear combi lamp.
Figure 5:
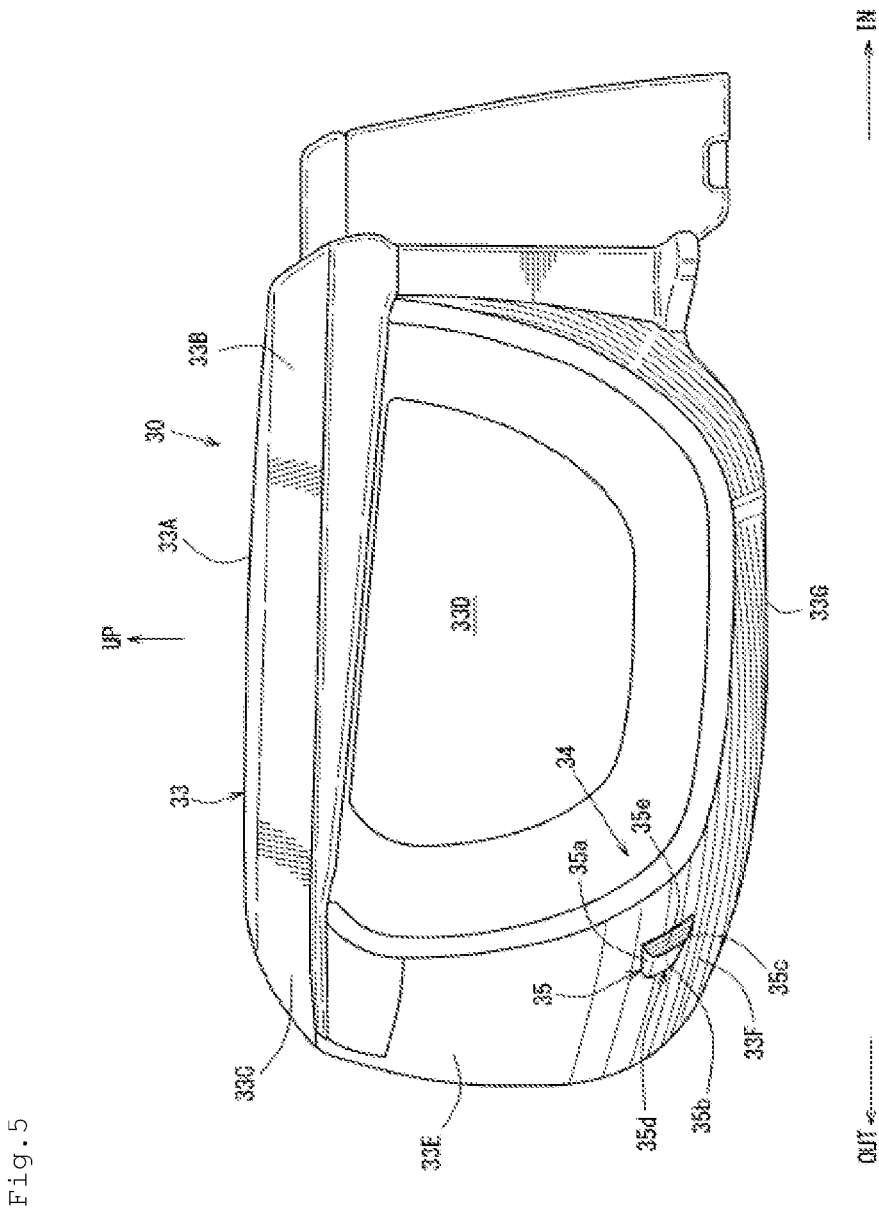
FIG. 5 is a rear view of the rear combi lamp.
Figure 6:
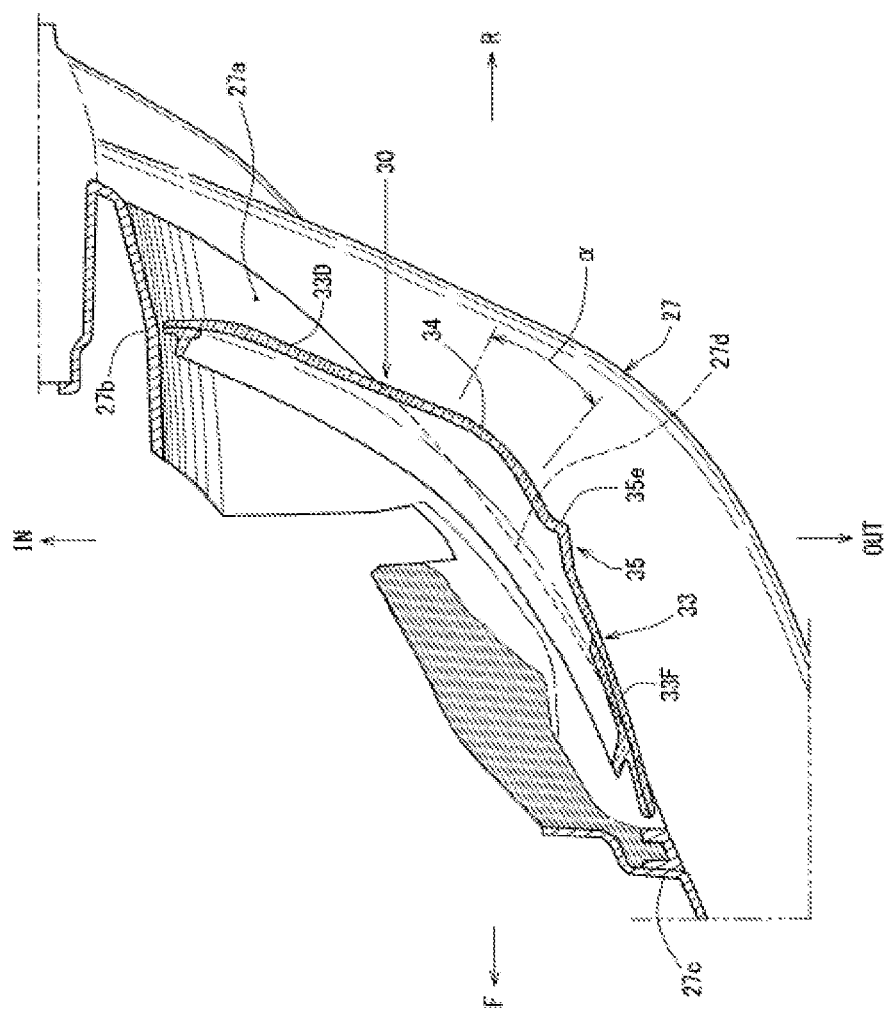
FIG. 6 is a cross-sectional view taken along the A-A arrow line in FIG. 4.

Hereinafter, one embodiment of this disclosure will be described in detail based on the drawings. The drawings show a rear vehicle-body structure of a vehicle, and FIG. 1 is a perspective view showing a state of the rear vehicle-body structure of the vehicle as viewed from diagonally above the left side of the vehicle. FIG. 2 is a plan view of a rear combi lamp, FIG. 3 is a perspective view of the rear combi lamp, FIG. 4 is a side view of the rear combi lamp, FIG. 5 is a rear view of the rear combi lamp, and FIG. 6 is a cross-sectional view as viewed from the A-A arrow direction in FIG. 4.

In the drawings, an arrow F indicates the direction toward the front of the vehicle, an arrow R indicates the direction toward the rear of the vehicle, an arrow IN indicates the direction toward the inner side in a vehicle width direction, an arrow OUT indicates the direction toward the outer side in the vehicle width direction, and an arrow UP indicates the direction toward the upper side of the vehicle.

In FIG. 1, a roof panel 10 for covering the top of a vehicle cabin and a trunk is provided. A roof side rail 11 extending in a vehicle front-rear direction is mounted on the top of a body side, on each of right and left sides of the roof panel 10. However, in the drawings, only the roof side rail 11 on the vehicle left side is shown for the sake of convenience of the drawings.

The roof side rail 11 is formed by joining and fixing a roof side rail outer and a roof side rail inner together, and includes a roof side closed cross-section extending in the vehicle front-rear direction. A front pillar (not shown), which is inclined in a front-low rear-high shape to be lower toward the vehicle front and higher toward the vehicle rear, is connected to a front end portion of the roof side rail 11.

The front pillar is formed by joining and fixing a front pillar outer and a front pillar inner together, and includes a front pillar closed cross-section extending in a diagonal direction. A rear pillar 12, which is inclined in a front-high rear-low shape to be higher toward the vehicle front and lower toward the vehicle rear, is connected to a rear end portion of the roof side rail 11. The rear pillar 12 is formed by joining and fixing a rear pillar outer and a rear pillar inner together, and includes a rear pillar closed cross-section extending in a diagonal direction.

The roof side rail 11, the front pillar, and the rear pillar 12 are vehicle body strengthening members, and form a side door opening 13 surrounded by the components of a hinge pillar in a vehicle front portion and a side sill in a vehicle lower portion in addition to the roof side rail 11, the front pillar, and the rear pillar 12. The side door opening 13 is configured to be opened and closed with a front door (not shown) which is pivotally supported by the hinge pillar, and a rear door 14 which is pivotally supported by a center pillar.

As shown in FIG. 1, a rear fender panel 15 for covering a side of the vehicle cabin and the trunk is mounted, and a fuel lid 16 is attached to be openable and closable, to the rear fender panel 15.

Formed in a vehicle rear end portion of this example is a trunk opening 17 surrounded by a rear-header rear end, rear ends of the left and right rear pillars 12, a rear end panel, and an upper end of a rear end cross member. The trunk opening 17 is covered to be openable and closable, with a lift gate 20. In the lift gate 20, a lower end 20b side of the lift gate 20 is opened with an upper end 20a side of the lift gate 20 as a support point.

The lift gate 20 includes a lift gate outer panel 21 and a lift gate inner panel. In an up-down direction intermediate portion of the lift gate 20, a rear window glass mounting portion 24 in a substantially square shape is formed by side portions 22 located on the sides in the vehicle-width-direction, a lower side portion 23 located on a lower side and extending in the vehicle width direction, and an upper side portion located on an upper side and extending in the vehicle width direction. A rear window glass (not shown) as a rear windshield is mounted to the rear window glass mounting portion 24.

As shown in FIG. 1, a rear roof spoiler 25 is mounted at an upper end portion of the lift gate 20. A top face of the rear roof spoiler 25 is formed to be aligned with a top face of the roof panel 10, and the rear roof spoiler 25 is mounted to be connected to the back end of the roof panel 10 in the vehicle front-rear direction.

By the way, as shown in FIG. 1, a quarter window mounting frame 26 having an annular structure is formed in a section surrounded by a lower portion of the roof side rail 11, a front portion of the rear pillar 12, a beltline BL at an upper end of the rear fender panel 15, and a rear portion of a door sash 14a of the rear door 14. A quarter window glass (not shown) as a quarter windshield is mounted to the quarter window glass mounting frame 26.

As shown in FIG. 1, a rear combi lamp 30 (more specifically, rear combination lamp 30) is mounted at the vehicle rear portion, and a rear bumper 27 extending in the vehicle width direction is mounted under the rear combi lamp 30.

As shown in FIG. 1, an over fender 29 is mounted over a lower end portion of the rear fender panel 15, which faces a rear wheel 28, and a front side of a vehicle-width-direction end portion of the rear bumper 27, which faces the rear wheel 28.

Here, the rear fender panel 15 is a part that covers a space surrounded by a rear portion of a door body 14b of the rear door 14, a lower portion of the beltline BL, a lower portion of the rear pillar 12, an outer side of a vehicle-width-direction outer end in a section lower than the lower side portion 23 of the lift gate 20, and an upper portion of a vehicle-width-direction end of the rear bumper 27.

The rear combi lamp 30 includes, inside the rear combi lamp 30, a stop lamp (meaning the same as a brake lamp) as a brake light, a turn signal lamp as a turn signal light, and a backup lamp as a reversing light. These stop lamp, turn signal lamp, and backup lamp are connected to a harness 31 as shown in FIG. 2, and a connector 32 is attached at a tip of the harness 31.

As shown in FIG. 2 to FIG. 6, the rear combi lamp 30 includes an outer lens 33 located on the outer side of the rear combi lamp 30, and an inner lens (not shown) located on the inner side of the outer lens 33. As shown in FIG. 2 to FIG. 6, the outerlens 33 of the rear combi lamp 30 includes an upper wall 33A having an elongated triangular shape in the vehicle plan view, an eave 33B extending diagonally rear-downward from a rear portion of the upper wall 33A, and a tapered part 33C extending diagonally outward and downward from a vehicle-width-direction outer end portion of the upper wall 33A.

As shown in FIG. 2 to FIG. 6, the outer lens 33 also includes a rear wall 33D extending downward from an offset position of the eave 33B toward the front of the vehicle, a side wall 33E extending downward from a lower portion of the tapered part 33C, and a round part 33F connected to a lower portion of the side wall 33E and extending, in a rounded manner, inward in the vehicle width direction. Moreover, as shown in FIG. 5, the outer lens 33 includes a lower wall 33G connected to the round part 33F and extending inward in the vehicle width direction.

Furthermore, as shown in FIG. 6 illustrating a cross-sectional view as viewed from the A-A arrow direction in FIG. 4, the outer lens 33 of the rear combi lamp 30 includes a curved portion 34 that is curved from the vehicle-width-direction outer side forwardly inward in the vehicle width direction in the vehicle plan view. The curved portion 34 is formed smoothly successively between the rear portion of the side wall 33E and the vehicle-width-direction outer portion of the rear wall 33D, and between the rear portion of the round part 33F and the vehicle-width-direction outer portion of the rear wall 33D. In FIG. 6, the range in which the curved portion 34 is formed is indicated by an arrow αc.

As shown in FIG. 3, the curved portion 34 is formed to have a curvature increasing toward the lower side of the vehicle. In other words, the curved portion 34 is formed to have a radius of curvature decreasing toward the lower side of the vehicle.

As shown in FIG. 3 and FIG. 6, a protruding portion 35 that protrudes toward the vehicle-width-direction outer side as going to the rear of the vehicle is integrally formed in a vehicle front portion relative to the curved portion 34. As shown in FIG. 3 and FIG. 5, the protruding portion 35 has a top face 35a, a side face 35b, a bottom face 35c, a tapered part 35d in which the protruding amount gradually increases toward the rear of the vehicle, and a rear face 35e that integrally connects the round part 33F with a back end of the tapered part 35d.

As shown in FIG. 4, when the length in the vehicle front-rear direction of the side wall 33E of the outer lens 33 is denoted by L2, a length L1 of the protruding portion 35 in the vehicle front-rear direction is set to a relatively shorter length, 7 to 8% of the length L2, but is not necessarily limited to this numerical value. Thus, by providing the protruding portion 35 at a front portion of the curved portion 34, the protruding portion 35 separates the air on a side of the vehicle (the vehicle body side-face airflow) so as not to flow around to the rear of the vehicle, thereby ensuring aerodynamic performance.

The curved portion 34 is formed to have a curvature increasing toward the lower side of the vehicle due to vehicle designability, and, on the vehicle-width-direction outer side of the rear combi lamp 30, the lower portion of the curved portion 34 has a shape constricted toward the vehicle-width-direction inner side as going to the lower side.

If the protruding portion 35 is not present, the vehicle body side-face airflow flows around to the rear of the vehicle from this constricted portion, but, when the protruding portion 35 is provided, the vehicle body side-face airflow is separated at the protruding portion 35, thereby preventing the vehicle body side-face airflow from flowing around to the rear of the vehicle.

As shown in FIG. 1 and FIG. 6, at a position on the rear bumper 27 at which the rear combi lamp 30 is installed, a recess 27a (see FIG. 1) is formed according to the shape of the bottom face of the rear combi lamp 30, and, at both vehicle-side-direction inner and outer portions of the recess 27a, a rising portion 27b on the vehicle-width-direction inner side and a rising portion 27c on the vehicle-width-direction outer side, which rise upward with respect to the recessed bottom face of the recess 27a, are integrally formed.

As shown in FIG. 6, the rear bumper 27 is formed with an upper outside face 27d that connects a back end of the rising portion 27b on the vehicle-width-direction inner side and a vehicle-width-direction outer end of the rising portion 27c on the vehicle-width-direction outer side.

As shown in FIG. 6, the curved portion 34 of the rear combi lamp 30 is located on the vehicle-width-direction outer side relative to the upper outside face 27d of the rear combi lamp 30 adjacent to rear combi lamp 30, in the vehicle plan view.

As shown in FIG. 6, the protruding portion 35 is provided at a position at which the air flowing on a side of the vehicle (the vehicle body side-face airflow) is originally drawn to the vehicle-width-direction inner side. The protruding portion 35 is provided in the vehicle front portion relative to a portion of the curved portion 34 of the rear combi lamp 30, which protrudes to the vehicle-width-direction outer side relative to the upper outside face 27d of the rear bumper 27. Consequently, the vehicle body side-face airflow is separated from the vehicle at the protruding portion 35, thereby preventing the vehicle body side-face airflow from flowing around to the rear of the vehicle, and preventing turbulence of the vehicle body side-face airflow.

Figure 7:
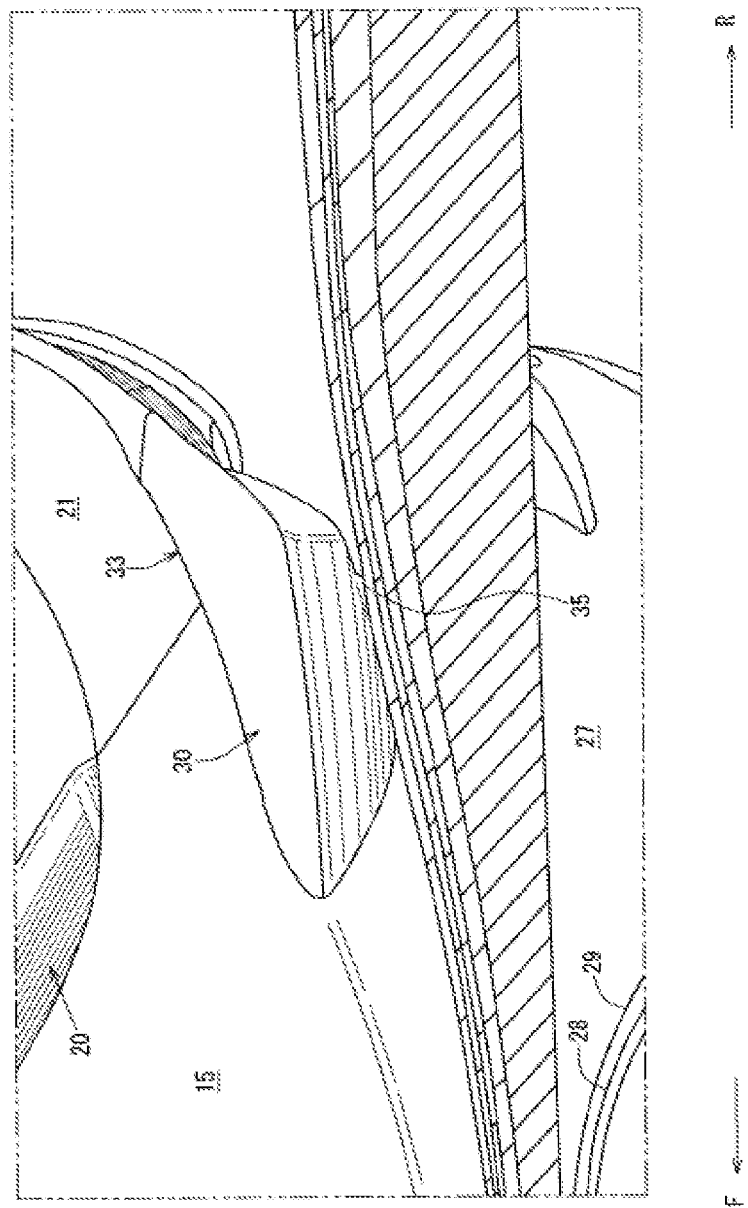
FIG. 7 is an explanatory view showing the air flowing on a side of the vehicle of this example.
Figure 8:
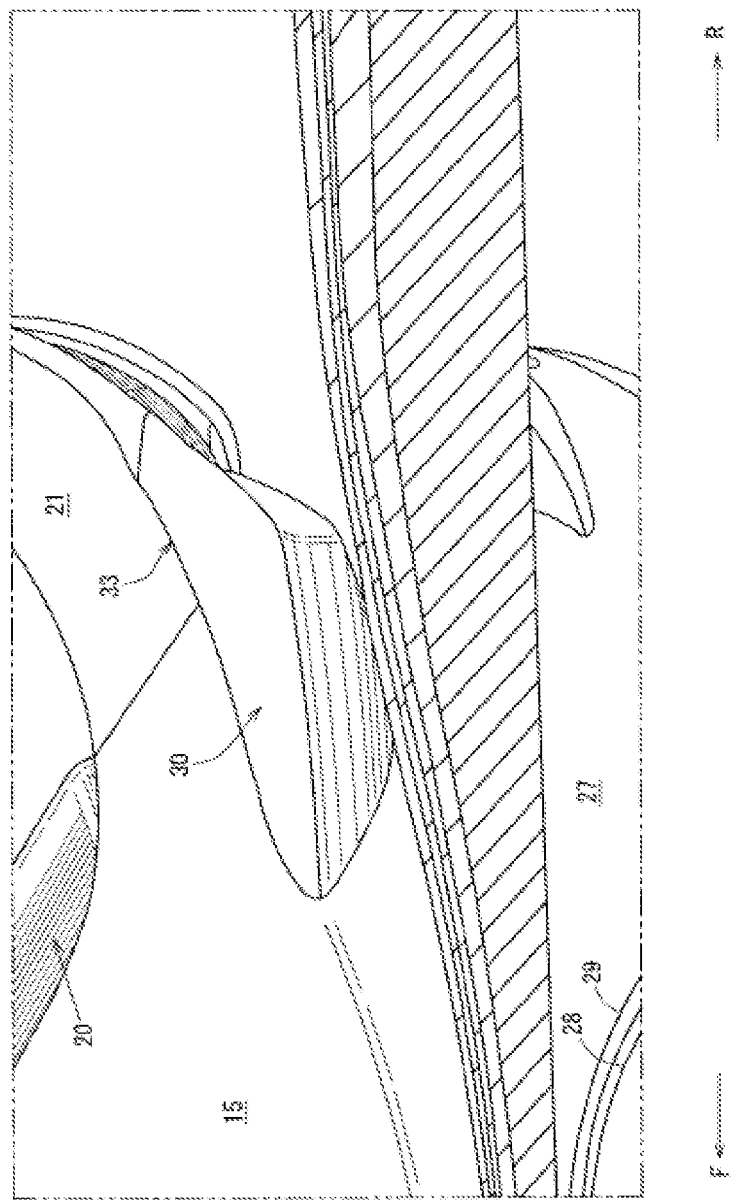
FIG. 8 is an explanatory view showing the air flowing on a side of a vehicle having a conventional structure.

FIG. 7 is an explanatory view showing the air flowing on a side of the vehicle (vehicle body side-face airflow) of this example, and FIG. 8 is an explanatory view showing the air flowing on a side of a vehicle (vehicle body side-face airflow) for the vehicle having a conventional structure in which the protruding portion 35 is not present. FIG. 7 and FIG. 8 show results of simulations performed under the same conditions to compare the air flowing on a side of the vehicle of the present example provided with the protruding portion 35 and the air flowing on a side of the vehicle of the conventional example in which the protruding portion 35 is not present.

In FIG. 7 and FIG. 8, for the sake of convenience of the drawings, the magnitude of energy of the vehicle body side-face airflow is indicated by coarseness and fineness of the density of hatching such that the higher the density of hatching, the larger the energy, and the lower the density of hatching, the smaller the energy.

In the present example shown in FIG. 7, since the protruding portion 35 was formed in the vehicle front portion relative to the curved portion 34, the vehicle body side-face airflow was separated at the protruding portion 35, which resulted in preventing the vehicle body side-face airflow from flowing around to the rear of the vehicle. In contrast, in the conventional example shown in FIG. 8, since no protruding portion 35 was present as described above, the vehicle body side-face airflow was not separated, which resulted in that the vehicle body side-face airflow was likely to flow around to the rear of the vehicle.

The rear vehicle-body structure of the vehicle of the above example includes the rear combi lamp 30 mounted on the vehicle-width-direction outer side face of the vehicle rear portion, and the rear bumper 27 mounted under the rear combi lamp 30, wherein the rear combi lamp 30 includes, on the vehicle-width-direction outer side face, the curved portion 34 curved from the vehicle-width-direction outer side forwardly inward in the vehicle width direction in the vehicle plan view, the curved portion 34 has a curvature increasing toward the vehicle lower side, and the protruding portion 35 that protrudes toward the vehicle-width-direction outer side as going to the rear of the vehicle is provided at a front portion of the curved portion 34 (see FIG. 1, FIG. 3 and FIG. 6). According to this configuration, the air on a side of the vehicle (the vehicle body side-face airflow) can be separated at the protruding portion 35 to prevent the vehicle body side-face airflow from flowing around to the rear of the vehicle, thereby making it possible to ensure aerodynamic performance.

In particular, the curved portion 34 is formed to have a curvature increasing toward the lower side of the vehicle due to vehicle designability, and, on the vehicle-width-direction outer side of the rear combi lamp 30, a lower portion of the curved portion 34 has a shape constricted toward the vehicle-width-direction inner side as going to the lower side.

If the protruding portion 35 is not present, the vehicle body side-face airflow flows around to the rear of the vehicle from this portion, but, separating the vehicle body side-face airflow at the protruding portion 35 makes it possible to prevent the vehicle body side-face airflow from flowing around to the rear of the vehicle.

In one embodiment of the present disclosure, the curved portion 34 of the rear combi lamp 30 is located on the vehicle-width-direction outer side relative to the upper outside face 27d of the rear bumper 27 adjacent to rear combi lamp 30 in the vehicle plan view (see FIG. 6). According to this configuration, the protruding portion 35 is provided at a position at which the air flowing on a side of the vehicle (the vehicle body side-face airflow) is drawn to the vehicle-width-direction inner side. In short, the protruding portion 35 is provided in front of a portion of the curved portion 34 of the rear combi lamp 30, which protrudes to the vehicle-width-direction outer side relative to the upper outside face 27d of the rear bumper 27. Consequently, it is possible to separate the vehicle body side-face airflow from the vehicle at the protruding portion 35, prevent the vehicle body side-face airflow from flowing around to the rear of the vehicle, and prevent turbulence of the vehicle body side-face airflow.

As described above, the present disclosure is useful for the rear vehicle-body structure of the vehicle including the rear combi lamp mounted on the vehicle-width-direction outer side face of the vehicle rear portion, and the rear bumper mounted under the rear combi lamp.

What is claimed is:

1. A rear vehicle-body structure of a vehicle, comprising: a rear combi lamp mounted on a vehicle-width-direction outer side face of a vehicle rear portion; and a rear bumper mounted under the rear combi lamp, wherein
   the rear combi lamp includes, on the vehicle-width-direction outer side face, a curved portion that is curved from a vehicle-width-direction outer side forwardly inward in a vehicle width direction in a vehicle plan view,
   the curved portion has a curvature increasing toward a lower side of the vehicle, and
   a protruding portion that protrudes toward the vehicle-width-direction outer side as going to a rear of the vehicle is located at a front portion of the curved portion.

2. The rear vehicle-body structure of the vehicle according to claim 1, wherein the curved portion of the rear combi lamp is located on the vehicle-width-direction outer side relative to an upper outside face of the rear bumper adjacent to the rear combi lamp, in the vehicle plan view.

3. The rear vehicle-body structure of the vehicle according to claim 2, wherein the rear combi lamp includes an outer lens comprising an upper wall having a triangular shape in the vehicle plan view, an eave extending diagonally rear-downward from a rear portion of the upper wall, a tapered part extending diagonally outward and downward from a vehicle-width-direction outer end portion of the upper wall, a rear wall extending downward from an offset position of the eave toward the front of the vehicle, a side wall extending downward from a lower portion of the tapered part, and a round part connected to a lower portion of the side wall and extending, in a rounded manner, inward in the vehicle width direction; and
   wherein the curved portion is smooth successively between a rear portion of the side wall and a vehicle-width-direction outer portion of the rear wall, and between a rear portion of the round part and the vehicle-width-direction outer portion of the rear wall.

4. The rear vehicle-body structure of the vehicle according to claim 3, wherein the curved portion has a radius of curvature decreasing toward the lower side of the vehicle.

5. The rear vehicle-body structure of the vehicle according to claim 4, wherein the protruding portion has a top face, a side face, a bottom face, a tapered part in which the protruding amount gradually increases toward the rear of the vehicle, and a rear face that integrally connects the round part with a back end of the tapered part.

6. The rear vehicle-body structure of the vehicle according to claim 5, wherein a length L1 of the protruding portion in the vehicle front-rear direction is 7% to 8% of a length L2 in the vehicle front-rear direction of the side wall of the outer lens.

7. The rear vehicle-body structure of the vehicle according to claim 1, wherein the rear combi lamp includes an outer lens comprising an upper wall having a triangular shape in the vehicle plan view, an eave extending diagonally rear-downward from a rear portion of the upper wall, a tapered part extending diagonally outward and downward from a vehicle-width-direction outer end portion of the upper wall, a rear wall extending downward from an offset position of the eave toward the front of the vehicle, a side wall extending downward from a lower portion of the tapered part, and a round part connected to a lower portion of the side wall and extending, in a rounded manner, inward in the vehicle width direction; and
   wherein the curved portion is smooth successively between a rear portion of the side wall and a vehicle-width-direction outer portion of the rear wall, and between a rear portion of the round part and the vehicle-width-direction outer portion of the rear wall.

8. The rear vehicle-body structure of the vehicle according to claim 1, wherein the curved portion has a radius of curvature decreasing toward the lower side of the vehicle.

9. The rear vehicle-body structure of the vehicle according to claim 1, wherein the protruding portion has a top face, a side face, a bottom face, a tapered part in which the protruding amount gradually increases toward the rear of the vehicle, and a rear face that integrally connects the round part with a back end of the tapered part.

10. The rear vehicle-body structure of the vehicle according to claim 7, wherein the curved portion has a radius of curvature decreasing toward the lower side of the vehicle.

11. The rear vehicle-body structure of the vehicle according to claim 7, wherein the protruding portion has a top face, a side face, a bottom face, a tapered part in which the protruding amount gradually increases toward the rear of the vehicle, and a rear face that integrally connects the round part with a back end of the tapered part.

12. The rear vehicle-body structure of the vehicle according to claim 8, wherein the protruding portion has a top face, a side face, a bottom face, a tapered part in which the protruding amount gradually increases toward the rear of the vehicle, and a rear face that integrally connects the round part with a back end of the tapered part.

13. The rear vehicle-body structure of the vehicle according to claim 11, wherein a length L1 of the protruding portion in the vehicle front-rear direction is 7% to 8% of a length L2 in the vehicle front-rear direction of the side wall of the outer lens.

* * * * *